United States Patent [19]

Hofmann et al.

[11] Patent Number: 4,475,777

[45] Date of Patent: Oct. 9, 1984

[54] SPLIT-RING ROLLER BEARING

[75] Inventors: Heinrich Hofmann, Schweinfurt; Rudi Eck, Gädheim, both of Fed. Rep. of Germany

[73] Assignee: FAG Kugelfischer Georg Schäfer & Co., Schweinfurt, Fed. Rep. of Germany

[21] Appl. No.: 358,781

[22] Filed: Mar. 16, 1982

[30] Foreign Application Priority Data

Mar. 28, 1981 [DE] Fed. Rep. of Germany ....... 3112303

[51] Int. Cl.³ ............................................. F16C 33/46
[52] U.S. Cl. .................................................... 384/572
[58] Field of Search ............... 308/193, 194, 195, 196, 308/201, 189 R, 217, 218, 235, 216, 207 R

[56] References Cited

U.S. PATENT DOCUMENTS

| | | | |
|---|---|---|---|
| 2,528,987 | 11/1950 | Ablett | 308/216 |
| 3,429,626 | 2/1969 | Teufel | 308/217 |
| 4,235,487 | 11/1980 | Schard | 308/201 X |
| 4,239,304 | 12/1980 | Wakunami | 308/217 |

OTHER PUBLICATIONS

James and James, Mathematics Dictionary, 1968, p. 89.
Publication *Walzlagertechnik* (p. 2ff, 1979–1, Firma FAG Kugelfischer Georg Schafer & Co.).

Primary Examiner—Stuart S. Levy
Assistant Examiner—David Werner
Attorney, Agent, or Firm—Karl F. Ross; Herbert Dubno

[57] ABSTRACT

A split roller bearing comprises a split inner race having a radially outwardly directed inner race surface, a split outer race surrounding the inner race and having an inwardly directed outer race surface generally concentric with the inner race surface, an annular row of rollers engaged radially between the inner and outer race surfaces, and a plurality of similar roller cage parts together forming an annular roller cage lying mainly between the inner and outer surfaces and formed with respective radially opening windows receiving the rollers. The cage parts each have a radius of curvature smaller than the radius of curvature of the inner surface in an unstressed condition. Thus it is possible to provide adequate material thickness at the ends of the cage parts to prevent the cage from wearing out at these locations. Since the rollers are movable radially in the pockets there is no binding between the rollers and the cage.

5 Claims, 3 Drawing Figures

SPLIT-RING ROLLER BEARING

FIELD OF THE INVENTION

The present invention relates to a split-ring roller bearing. More particularly this invention concerns a two-row self-centering roller bearing of the large-format type with split rings.

BACKGROUND OF THE INVENTION

A standard roller bearing has an annular inner race centered on an axis and formed with a radially outwardly directed inner annular race surface, an annular outer race surrounding the inner race and having an inwardly directed outer race surface concentric with the inner surface, at least one annular row of rollers engaging both of the surfaces, and an annular cage formed with respective radially open windows for the rollers. The rollers may be balls, cylinders, or crowned cylinders known as barrels. With ball and barrel rollers the race surfaces are of a curvature complementary to the rollers and with cylindrical rollers these surfaces are cylindrical.

It is normally considered preferable to employ one-piece or unitary races and cages. When of such construction the races are stronger and their race surfaces are smooth and initerrupted by a seam. With a one-piece cape the webs between the windows can be reduced to a minimal angular width so that the maximum number of rollers can be used, thereby minimizaing loading of the bearing.

In many applications use of unsplit or one-piece bearings is impossible. This is the case where axial access to the bearing location is limited, or where a machine would have to be largely disassembled to pull the shaft and replace the bearing. In addition in very large applications, as with shafts of, say, one meter or more in diameter, it is impossible to use such an unsplit bearing.

Hench recourse is has to so-called split-ring bearings. Such a bearing simply has its two races and cage each formed of two or more generally identical parts that can be assembled to form the respective parts. Thus on a large shaft needing a new bearing the bearing location is uncovered on one side and the old bearing is disassembled or cut off. The inside race is then assembled on and clamped by its holding rings on this shaft. One part of the outer race is fitted to the machine housing, and then the cage parts each carrying the respective roller are assembled around inner race. Finally the outer-race part or parts are secured around the rollers and cage to the installed outer-race part, and the machine is closed up. Such a procedure does not require the shaft to be pulled or axially displaced at all relative to its housing. All that is needed is a small amount of radial movability of the shaft at the bearing location.

A principal disadvantage of such split roller bearings, as discussed in the publication Walzlagertechnik (p. 2ff, 1979-1, Firma FAG Kugelfischer Georg Schafer & Co.), is that they cannot use as many rollers as unsplit bearings of the same size. Thus they inherently must be rated for smaller loads and lower operating speeds. This is due to the necessity of providing a minimal web dimension around each roller window, so that at each joint between two cage parts this circumferential dimension must be doubled, thereby taking up space that could otherwise be occupied by a roller.

It has been suggested to eliminate the cage between the rollers, and to support the rollers by pins carried on washers axially flanking the row of rollers. This necessitates machining pivot holes in the roller ends, and makes fitting the bearing together quite tricky.

OBJECTS OF THE INVENTION

It is therefore an object of the present invention to provide an improved split roller bearing.

Another object is the provision of such a split roller bearing which overcomes the above-given disadvantages.

A further object is to provide a novel split roller bearing which can have as many rollers as an unsplit bearing of identical size.

SUMMARY OF THE INVENTION

These objects are attained according to the instant invention in a split roller bearing comprising, as described above, a split inner race having a radially outwardly directed inner race surface, a split outer race surrounding the inner race and having an inwardly directed outer race surface generally concentric with the inner race surface, an annular row of rollers engaged radially between the inner and outer race surfaces, and a plurality of similar roller cage parts together forming an annular roller cage lying mainly between the inner and outer surfaces and formed with respective radially opening windows receiving the rollers. According to this invention the cage parts each have a radius of curvature smaller than the radius of curvature of the inner surface in an unstressed condition.

As a result of shifting the centers of curvature of the cage parts out from the center of the bearing, slightly bigger cage parts can be used than would hitherto have been possible. Thus it is possible to provide adequate material thickness at the ends of the cage parts to prevent the cage from wearing out at this location. Since the rollers are movable radially in the pockets, which according to this invention have radially extending inner end faces, there is no binding between the rollers and the cage.

Thus according to this invention the cage is formed between the windows with webs each having an angular dimension equal to about twice the difference between the radii of curvature of the cage parts and inner race surface. Such a relationship between these dimensions is ideal in a bearing having an even number of rollers and two identical cage halves.

The cage according to the instant invention can be made quite cheaply. In fact it is possible to cut a cage part according to the instant invention out of a conventional one-piece cage normally employed in a larger bearing. A light synthetic resin is used to make the cage of this invention so that its minor mass will not create a throw problem when the bearing rotates at high speed.

DESCRIPTION OF THE DRAWING

The above and other features and advantages will become more readily apparent from the following, reference being made to the accompanying drawing in which.

SPECIFIC DESCRIPTION

Figure 1:
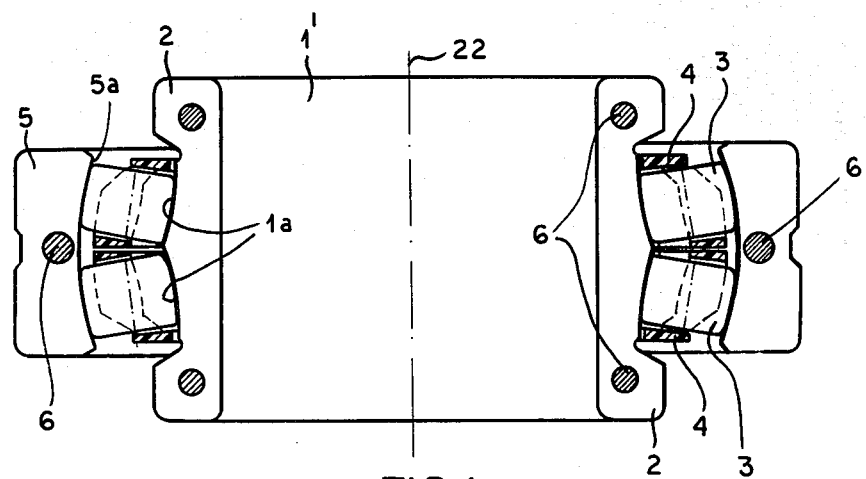
FIG. 1 is an axial section through the bearing according to this invention.
Figure 2:
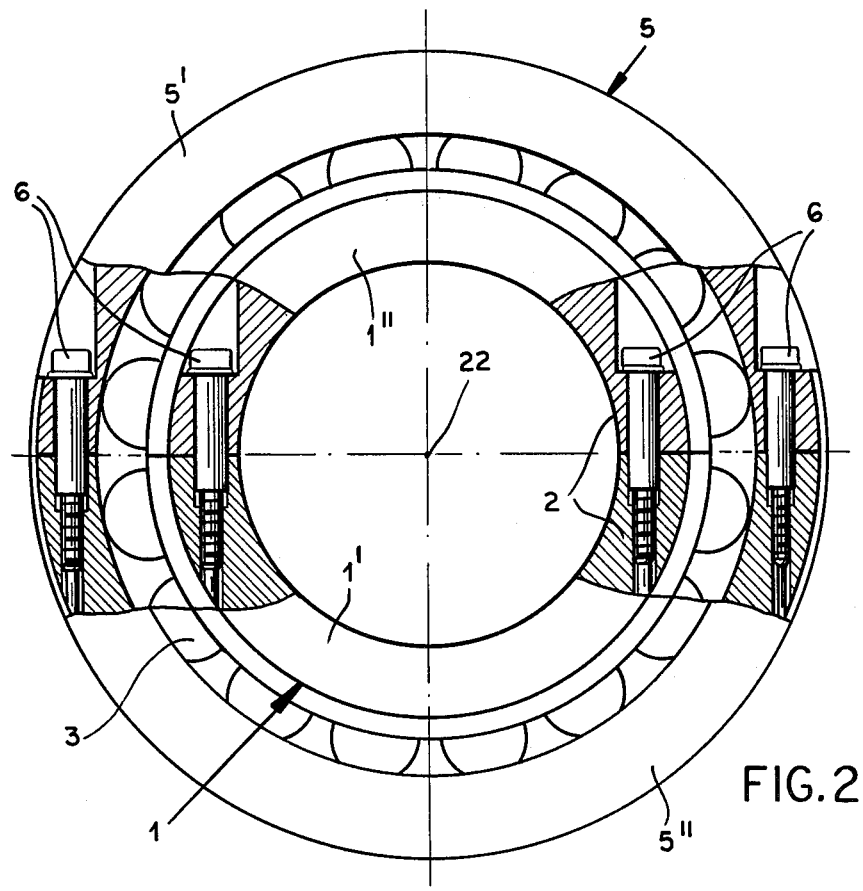
FIG. 2 is an axial end view partly broken away of the bearing of FIG. 1.

As seen in the drawing a split roller bearing centered on an axis 22 has an inner ring 1 formed of a pair of semicylindrical parts 1' and 1" formed with connection flanges 2, an outer ring 5 formed of two similar semicylindrical parts 5' and 5", two rows 3 of an even number of roller barrels 3', and a cage 4 formed by two identical cage parts 7 and 8. Secantal bolts 6 secure the halves of the inner and outer races 1 and 5 together at a joint plane 14. The inner race 1 forms two race surface 1a centered on the axis A and the outer race 5 forms a single outer race surface 5a formed as a part-spherical surface centered on the axis A and of the same radius of curvature as the outer surfaces of the barrels 3'. Thus this bearing is of the self-centering type that allows the inner ring 1 to be slightly misaligned axially with the outer ring, although in the drawing these two parts are 1 and 5 are shown perfectly coaxial.

Figure 3:
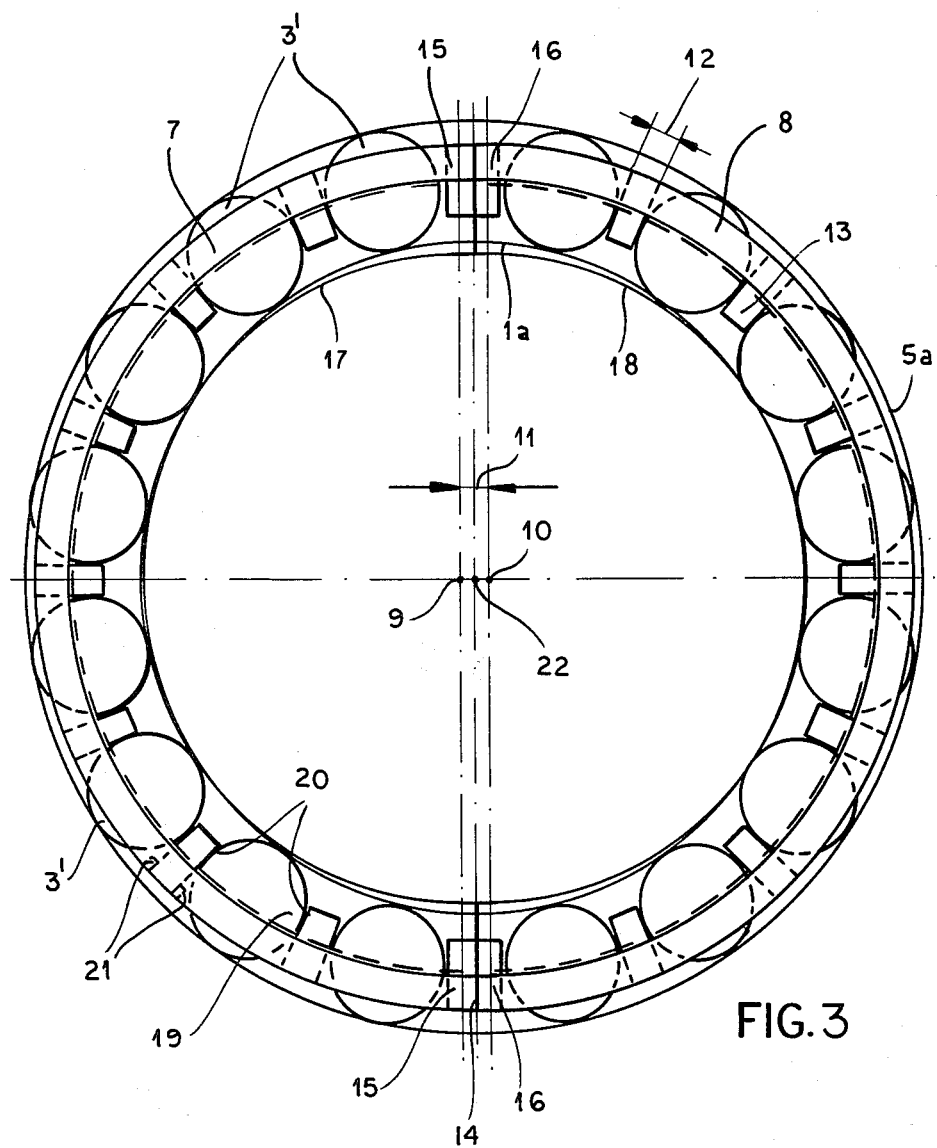
FIG. 3 is a large-scale axial end view of the cage-and-roller assembly of the bearing of the present invention.

According to the instant invention the cage halves or parts 7 have respective centers 9 and 10 of curvature each offset radially outwardly from the axis 22 by a half of a distance 11 which is the diametral spacing between these centers 9 and 10. This spacing 11 is equal to the minimum circumferential or angular dimension 12 of the webs 13 that form the windows 19 that receive the respective barrels 3'. The windows 19 are of the same shape as an axial section through the respective barrels 3' which they snugly receive, although with free movability radially in the respective windows 19. The ends of the cage halves 7 and 8 therefore have full webs 15 and 16 calculated in dependence mainly on the material strength of the cage 4. Thus when unstressed the cylindrical inner peripheries 17 and 18 of the cage halves 7 and 8 lie at their ends inside the surface 1a of the inner race, which surface 1a is indicated in FIG. 3 along with the surface 5a.

Th webs 13 have radially extending flanks 20 defining the angular end surfaces of the windows 19 and are formed with bumps 21 on their outer edges. These bumps 21 retain the rollers 3' in the windows or pockets 19 even when the assembly is not installed, as shown in FIG. 3.

The cage 4 is made of a synthetic resin, normally a polyamide such as nylon. It is limitedly axially deformable and, even though it is not centered, its slight mass does not create any perceptible vibration problem, even at high speed. Although here the two cage parts 7 and 8 are identical or at least mirror symmetrical, it is possible in a bearing having an uneven number of rollers for one to be larger than the other. Thus this larger one, which has the odd roller, is elastically deformed when it is mounted with its rollers on the inner race. Additionally it is possible in very large assemblies to use more than two parts for the cage 4, in particular where the assembly must be done in cramped locations.

The bearing according to the instant invention can in fact be made so compact that it is possible to provide small split roller bearings to replace unsplit bearings. The normally low ratings for split bearings are not shared by the bearing of this invention, which greatly eases service problems as split bearings are much easier to install and service than insplit ones.

We claim:

1. A split roller bearing comprising:
    an inner race having a radially outwardly directed inner race surface centered on an axis;
    an outer race surrounding said inner race and having an inwardly directed outer race surface generally concentric with said inner race surface;
    an annular row of rollers engaged radially between said inner and outer race surfaces; and
    a plurality of similar roller cage parts together forming an annular roller cage lying mainly between said inner and outer surfaces and formed with respective radially opening windows receiving said rollers, said cage parts each having an inner radius of curvature smaller than the radius of curvature of said inner surface in an unstressed condition and a center of curvature offset from the inner-race axis.

2. The bearing defined in claim 1 wherein said inner and outer races are split respectively into inner and outer race parts, said bearing further comprising means for holding said inner race parts together and for holding said outer race parts together.

3. The bearing defined in claim 1 wherein sadi cage is formed between said windows with webs each having an angular dimension equal to about twice the difference between the radii of curvature of said cage pats and inner race surface.

4. A split roller bearing comprising:
    an inner race having a radially outwardly directed inner race surface centered on an axis;
    an outer race surrounding said inner race and having an inwardly directed outer race surface generally concentric with said inner race surface;
    an annular row of rollers engaged radially between said inner and outer race surfaces; and
    a plurality of similar roller cage parts together forming an annular roller cage lying mainly between said inner and outer surfaces and formed with respective radially opening windows receiving said rollers, said cage parts each having an inner radius of curvature smaller than the radius of curvature of said inner surface in an unstressed condition and a center of curvature offset from the inner-race axis; said windows having angularly directed side surfaces that extend generally radially of the center of said bearing.

5. The bearing defined in claim 1 wherein said cage has two such identical parts.

* * * * *